US007133677B2

(12) United States Patent
Feder et al.

(10) Patent No.: US 7,133,677 B2
(45) Date of Patent: Nov. 7, 2006

(54) SYSTEM AND METHOD FOR ESTABLISHING AND/OR MAINTAINING A DATA SESSION ACROSS PACKET DATA NETWORKS

(75) Inventors: Peretz Moshes Feder, Englewood, NJ (US); Gang Li, Bridgewater, NJ (US); Martin Howard Meyers, Montclair, NJ (US); Ajay Rajkumar, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 457 days.

(21) Appl. No.: 10/347,807

(22) Filed: Jan. 22, 2003

(65) Prior Publication Data

US 2004/0142693 A1 Jul. 22, 2004

(51) Int. Cl.
*H04Q 7/20* (2006.01)
(52) U.S. Cl. .................. 455/443; 455/436; 455/438; 455/439; 455/435.2; 455/435.3
(58) Field of Classification Search ............... 455/428, 455/443, 433–434, 435.2, 435.3, 357.1, 432.1, 455/436, 438, 439
See application file for complete search history.

(56) References Cited

U.S. PATENT DOCUMENTS

| 6,272,315 B1 * | 8/2001 | Chang et al. ............... 455/13.1 |
| 6,813,284 B1 * | 11/2004 | Vayanos et al. ............ 370/537 |
| 6,847,623 B1 * | 1/2005 | Vayanos et al. ............ 370/335 |
| 2001/0024953 A1 * | 9/2001 | Balogh ....................... 455/432 |
| 2002/0176366 A1 * | 11/2002 | Ayyagari et al. ............ 370/245 |
| 2003/0118015 A1 * | 6/2003 | Gunnarsson et al. ........ 370/389 |
| 2004/0001467 A1 * | 1/2004 | Cromer et al. .............. 370/338 |
| 2004/0023640 A1 * | 2/2004 | Ballai ......................... 455/411 |
| 2004/0160918 A1 * | 8/2004 | Narasimha .................. 370/335 |
| 2005/0043026 A1 * | 2/2005 | Brok et al. ................. 455/434 |
| 2005/0101329 A1 * | 5/2005 | Gallagher ................... 455/436 |
| 2005/0128986 A1 * | 6/2005 | Vayanos et al. ............ 370/335 |

OTHER PUBLICATIONS

David Benenati et al.; "A Seamless Mobile VPN Data Solution for CDMA2000,* UMTS, and WLAN Users"; © 2000; pp. 143-165.
C. Perkins; "IP Mobility Support for IPV4"; RFC 3220, IETF, Aug. 2002.
Telecommunications Industry Association, "Wireless IP Network Standard"; TIA/EIA/IS-835-A; Electronic Industries Alliance, Jul. 2001.

* cited by examiner

*Primary Examiner*—Binh K. Tieu

(57) ABSTRACT

A communication system selection algorithm (SSA) implemented by a mobile station chooses between available systems to select a system to serve the mobile station. During initialization, the SSA causes the mobile station to scan the environment and compare available communication systems to determine the best system to provide service. After an initial system is chosen, the SSA causes the mobile station to continuously, or at discrete time intervals, scan the environment for available systems, thus allowing for a seamless switch to an available system whenever a handoff is desired. The SSA chooses the best available system based on measurements of each available system and applying preference rules defined by a service provider and/or user of the mobile station.

30 Claims, 2 Drawing Sheets

SYSTEM AND METHOD FOR ESTABLISHING AND/OR MAINTAINING A DATA SESSION ACROSS PACKET DATA NETWORKS

BACKGROUND OF THE INVENTION

The present invention relates to wireless and wireline communications networks and, more particularly, to a method for a mobile client to choose amongst wireless and wireline service providers.

DESCRIPTION OF THE RELATED ART

Currently, a subscriber using a mobile station, such as that shown in FIG. 1, can connect to a wireless or wireline communication network in order to conduct a data session, e.g., an Internet session. For example, mobile stations such as personal digital assistants (PDAs) or laptop computers may be used to conduct a data session.

The Mobile IP standard currently provides seamless mobility in the IP layer by maintaining the same IP address across different systems. However, Mobile IP does not proactively seek another communication system until the current system cannot maintain a connection.

SUMMARY OF THE INVENTION

The present invention provides a system selection algorithm (SSA), which is run on the mobile client of a mobile station, to choose between available communication systems during initialization of the mobile station, or to seamlessly switch between systems while a data session is being conducted on the mobile station. The SSA continuously monitors the disparate wireless and wireline communication systems to initiate a "make before break" seamless handoff to the "best" system based on various criteria, in contrast to Mobile IP.

During initialization, the SSA causes the mobile station to scan the environment for available systems, and perform comparisons to determine the best system available for providing service. After a system is initially chosen, the mobile station continuously (or at configurable discrete intervals) scans available systems according to the SSA and performs comparisons to choose a best available system. The conditions of the currently serving system are also monitored, and the SSA initiates or assists in handoff to the chosen system whenever necessary. According to this algorithm, the mobile station may be seamlessly handed off to the best available system, regardless of whether or not the best system is disparate from the current system. The SSA compares the available systems according to measurable conditions, which are monitored for each available system. While comparing systems, the SSA applies a set of preference rules to the service provider preference rules, which are downloaded to the mobile client from the primary service provider with whom the user subscribes. These rules may also include preferences configured by the user.

By continuously determining a best available system according to the conditions and preference rules, while monitoring the conditions of the currently serving system, the mobile client is prepared to switch from the current system to another when necessary. Accordingly, the SSA of the present invention allows for the mobile station to switch to another network, while maintaining the current data session during the switch. The switch can therefore be seamless, so that the user does not realize a switch has occurred.

Other advantages of the present invention will become more apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawing, which is given for purposes of illustration only, and thus do not limit the present invention.

DETAILED DESCRIPTION OF THE EXEMPLARY EMBODIMENTS

Figure 1:
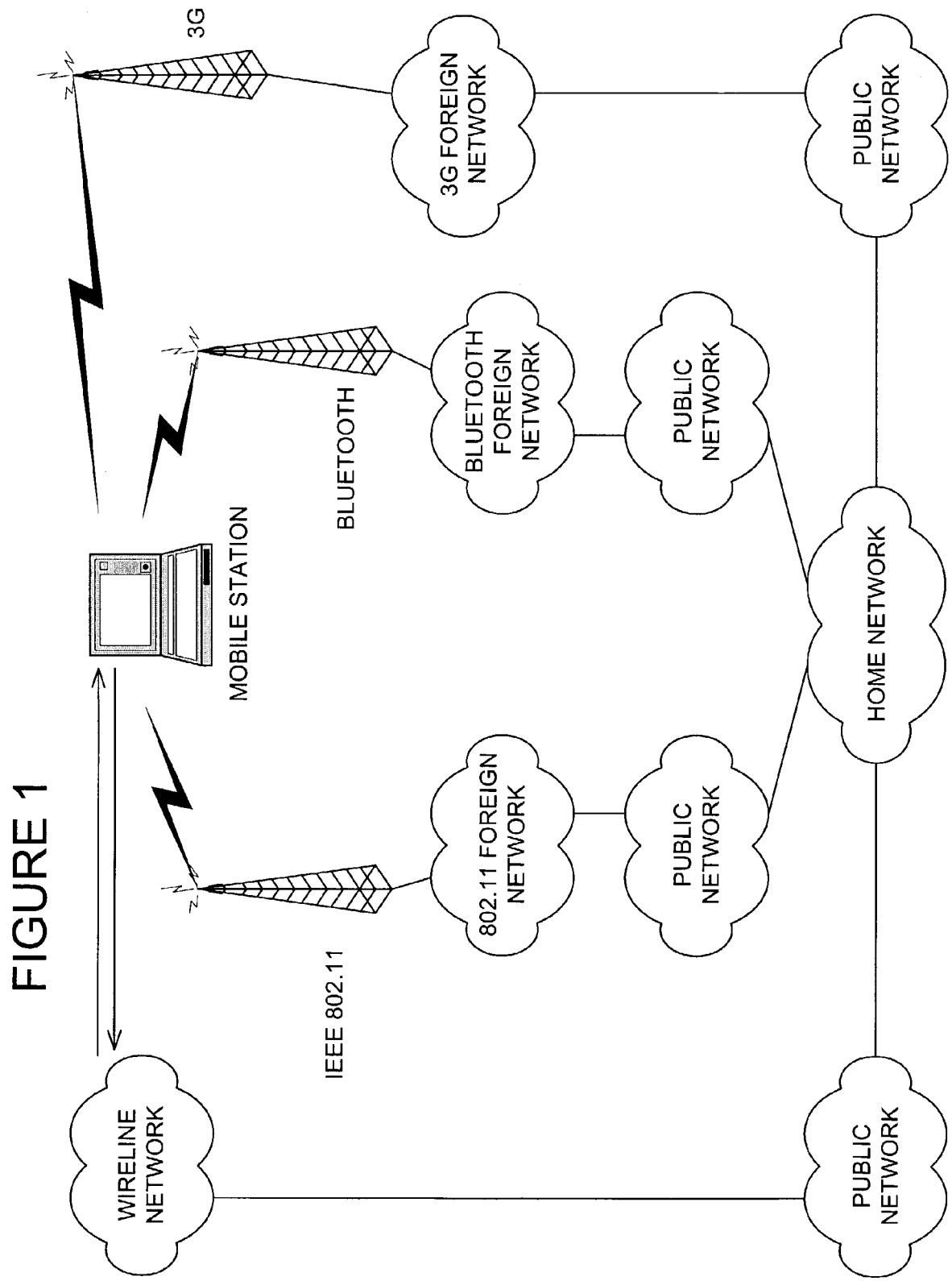
FIG. 1 illustrates a high level architecture of a generic network in which a mobile device is capable of conducting a data session using one of multiple types of communication systems.

The present invention relates to a system selection procedure (SSA) that is incorporated in a mobile client. A "mobile client" is defined as application software that runs on a mobile station. A mobile station may be any data processing device with wireless and wireline communication capabilities, such as, but not limited to, laptop computer, personal digital assistant, etc. For wireless communication systems, radio frequency and baseband processing may be performed by a PCMCIA card or other RF front end circuitry. Also, a mobile station may be capable of using data services from two or more different wireless and wireline systems, either one at a time or simultaneously.

According to an exemplary embodiment, the SSA runs continuously in the mobile client, causing the mobile station to scan the environment and monitor available systems, either continuously or at discrete time intervals. The mobile station collects measurements in order to monitor the conditions of each available system. The measurements are reported to the SSA, and a set of preference rules are applied to these measurements to determine the best available system. The SSA is configured to run according to the following three modes:

1) Initial system selection mode: during initialization of the mobile client, the SSA causes the mobile station to check the environment, scanning for available systems. The SSA then chooses one of the available system to serve the mobile station. The SSA may choose the best available system based on a comparison of monitored conditions, or a system mandated by the service provider in a downloaded set of service provider preferences, described in more detail in the Preference Management section below.

2) Normal traffic mode: after initial service has been established, the SSA may then cause the mobile station to initiate a handoff to a best available system (determined according to ongoing monitoring and comparison steps), when certain conditions are met.

3) Handoff Mode: if the SSA determines that the currently serving system cannot maintain the service, based on changes in monitored conditions (e.g., channel conditions) of the serving system, the SSA initiates a handoff of the mobile station to the best available system (if the best available system is a better alternative to the current system).

Exemplary embodiments of the present invention will be described below in connection with high-speed wireline systems, Third Generation (3G) systems, wireless local area network (WLAN) systems (including both IEEE 802.11 systems and Bluetooth systems), and Bluetooth-based personal area network (PAN) systems. The term 3G system will be used to refer to different types of Third Generation systems, including cdma2000, UMTS, 3G-EVDO, 3G-EVDV, HSDPA, as well as other evolving 3G systems.

It should be noted that 3G, WLAN, and PAN systems are merely examples of the types of systems, which may be used to service the mobile station in the present invention; and the present invention is not limited to these types of wireless systems. For instance, the mobile station may be serviced by various types of cellular communication systems including, but not limited to, 3G systems and various types of wireless packet data networks including, but not limited to, 802.11-based systems. Thus, according to an exemplary embodiment, the present invention may allow for seamless switching between cellular networks and wireless packet data networks.

Overview of the SSA

Figure 2:
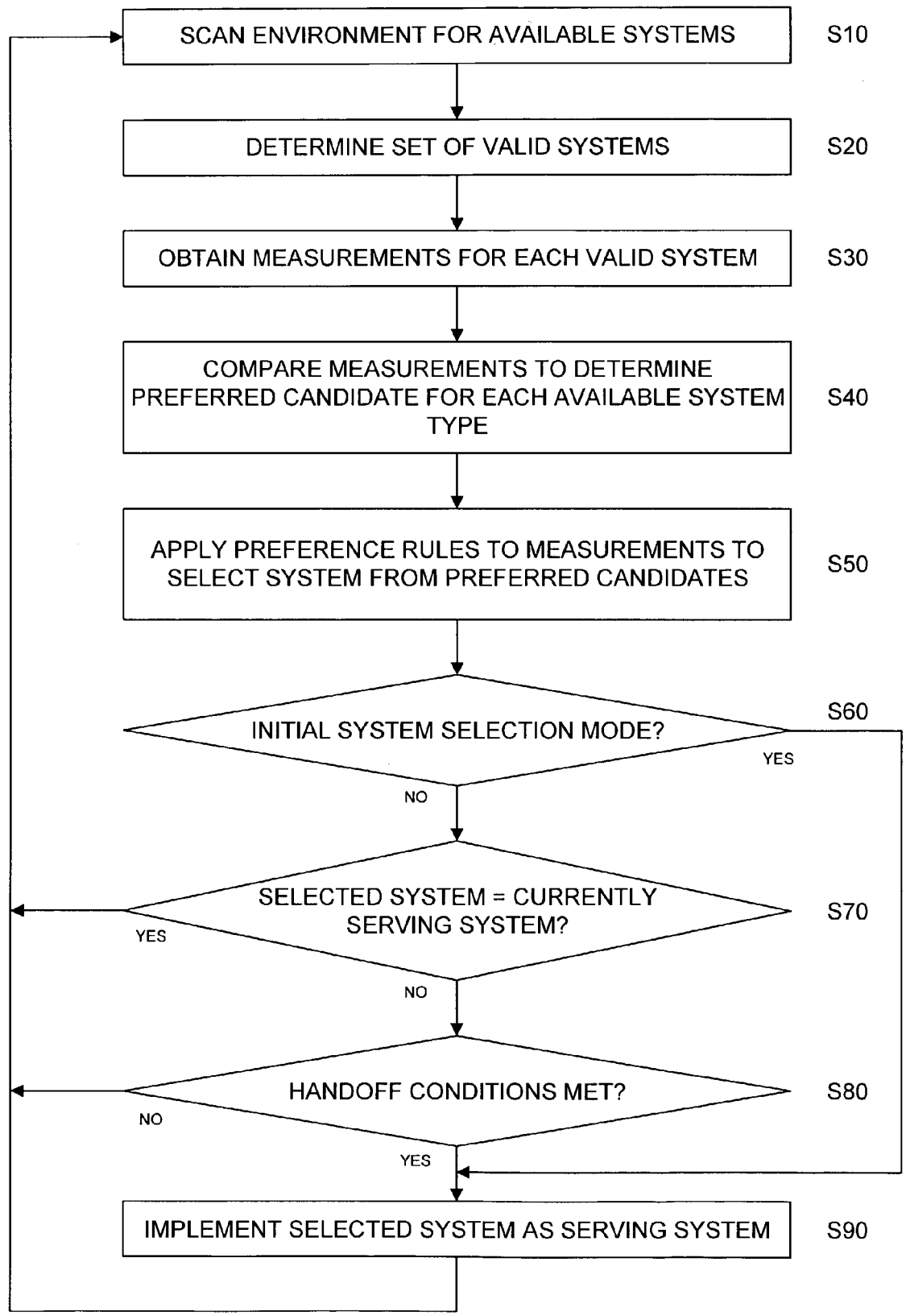
FIG. 2 is a flowchart illustrating the steps performed by the system selection algorithm (SSA) according to an exemplary embodiment of the present invention.

FIG. 2 is a flowchart of the steps performed by the SSA according to an exemplary embodiment of the present invention. For the purpose of explanation only, the process illustrated in FIG. 2 will be described as being implemented in the system shown in FIG. 1. However, the process illustrated in FIG. 2 is not limited to such an implementation. In step S10, the SSA instructs the mobile station to scan the environment to detect available systems. The systems detected by the mobile station may include systems of a type, which is different than, and disparate (i.e., not compatible) with respect to, the system currently serving the mobile station.

In step S20, the SSA determines which of the available systems detected in step S10 are valid, i.e., which systems the mobile station is authorized to use. This step may involve checking each available system detected in step S10 to a list of allowable systems in the mobile client. Accordingly, the SSA would determine a set of valid systems as including the currently serving system (which must be valid since it was already selected by the SSA), and any system detected in step S10, which is on the list of allowable systems.

In an exemplary embodiment, the list of allowable systems includes those systems either operated by, or having a Service Level Agreement (SLA) with, the primary service provider. An SLA is a type of agreement whereby a wireless service provider (e.g., 802.11 hot spot operator) agrees to service subscribers of a primary service provider (e.g., a 3G network operator), usually in exchange for a share of the subscriber fees collected by the primary service provider.

It should be noted that even though the primary service provider permits the mobile station to roam to other systems having an SLA, the primary service provider still "owns" (controls the rights of) the roaming subscriber. Accordingly, the primary service provider sets the service provider rules for the mobile unit of the subscriber.

The SSA receives measurement reports for each valid system for the mobile station in step S30. Accordingly, step S30 allows the SSA to monitor conditions, e.g., radio link conditions for each valid wireless system and the availability of high-speed wireline system. The types of measurements and conditions monitored by the SSA will be described in the section below entitled Monitoring Conditions for Available Systems.

The scanning and monitoring processes of steps S10–S30 may be performed continuously while the mobile station is operating. Alternatively, the SSA may be configured to repeat steps S10–S30 after a particular time duration has passed.

While steps S10–S30 illustrate exemplary steps to allow the mobile station to find available systems, the present invention should not be construed as being limited to these scanning steps. Instead of relying on the mobile station to frequently scan the environment for signals from available systems, the present invention may utilize a message-based approach to notify the mobile client of other valid systems, which are available in an alternative embodiment. In this embodiment, the serving wireless system sends a message to the mobile unit identifying other valid wireless systems when they become available.

For example, in 3G systems such as cdma2000, system parameters are broadcast over the cell to mobile units. The cdma2000 system could notify mobile stations of the presence of a valid alternative system, e.g., a valid 802.11 hot spot, in the broadcast message. In another example, if the mobile station is currently being served by a 802.11 system, a broadcast message can be added to the 802.11 beacon to identify valid 3G systems available in the area.

Referring back to FIG. 2, in step S40, the SSA compares the various measurements in order to determine a preferred candidate system for each of the disparate types of networks available. The preferred candidate system represents the "best" available network for each network according to the measurements. For example, when multiple valid 3G service providers are detected in the environment, along with a set of valid 802.11 WLANs and a set of valid Bluetooth WLANs, a preferred candidate system is selected for each of the set of 3G systems, the set of 802.11 systems, and the set of Bluetooth systems.

In an exemplary embodiment, the SSA assigns a score to each available system based on the measurements, and compares these scores to determine the preferred candidate for each network type. The preference rules may include rules defining how measurements relating to different conditions (e.g., radio link, system performance, high-speed wireline availability, etc.) are scored. The scoring will be described further below in the Preference Management section.

When the serving system is a wireline system, the relevant measurement may be whether an active connection to the serving wireline system still exists. In an exemplary embodiment, if the SSA determines that the connection is still active, the serving wireline system may be selected according to the preference rules to continue to serve the mobile unit, regardless of the scores of the other available systems.

According to step S50, the preference rules are applied by the SSA to select one of the preferred candidate systems. The preference rules are used to compare different types of networks according to both the measurements (i.e., monitored conditions) and the preferences of the primary service provider and/or user.

For certain types of conditions, a direct comparison of disparate types of networks can be made based on the measurements performed. For example, a signal strength indicator (RSSI) for each system can be measured for each wireless system type in order to compare the radio coverage areas of the disparate systems. However, for other types of monitored conditions, different types of measurements must be taken from the disparate systems, for which a direct comparison cannot be made.

As indicated in decision block S60, if the SSA is running in initial system selection mode (i.e., no system is currently serving the mobile station), the SSA jumps ahead to step S90 where the system selected in step S50 is implemented as the serving system, i.e., the mobile station connects to the selected system, and a data session may be initiated.

However, if the SSA is running either in the normal traffic mode or the handoff mode, it is determined whether the currently serving system has been selected, as shown in decision block S70. If the currently serving system has been selected, no handoff is required by the SSA, which once again starts scanning for available systems according to step S10.

However, if another system is selected, a determination is made as to whether the conditions for initiating a handoff have been met, as indicated by decision block S80. These handoff conditions may be contained in one or more preference rules, which apply thresholds to the monitored conditions of the selected system and/or the currently serving system, as described in the Preference Management section below. For example, if the serving system is a wireline system, the condition for initiating the handoff may be met when the SSA detects that the mobile unit is no longer actively connected to the serving wireline system.

If the handoff conditions are not met, no handoff is performed, and the SSA returns to its scanning mode in step S10. If the handoff conditions are met, the SSA implements the selected system to service the mobile station in step S90, by initiating or assisting in the handoff of the mobile station to the selected system. Then, the SSA returns to step S10.

The SSA runs continuously while the mobile unit is conducting a data session. The SSA therefore continuously determines a best available system (i.e., preferred candidate system) based on monitored conditions and the preferences of the primary service provider and/or user. By having already determined the best available system, the mobile unit is prepared to perform a handoff whenever the conditions associated with the currently serving system make it necessary to switch systems. Thus, the handoff proceeds seamlessly, even when the mobile unit is being handed off to a disparate type of network.

Monitoring Conditions for Available Systems

The SSA can make its decisions for system selection according to various types of information collected at the mobile receivers and/or each system. Specifically, the SSA may take into consideration one or more of the following factors:

1) Availability of a high-speed wireline connection. This information is available to the mobile client software through the standard operating system interface.

2) Radio link conditions (e.g., radio coverage area and forward link interference). This type of information can be gathered using measurements obtained at the mobile unit. A further description of radio link conditions is provided below.

3) System loading conditions (e.g., forward and reverse link loading). Such information may be measured and communicated by each available system.

4) Service quality (e.g., data bit rate). Direct performance measurements for each system may be obtained using short "probe" sessions. When a mobile station includes multiple RF front-ends, multiple parallel probe sessions may be used for multiple wireless systems. If only one RF front-end is available, probe sessions can be performed sequentially. Similarly, for currently serving wireline systems, probe sessions can determine whether a particular connection is active or not.

Radio Link Conditions

The SSA can monitor radio link conditions through measurement reports from the radio receivers of the mobile client. In order to compare radio link conditions, the SSA receives measurements from radio receivers within the mobile station. For example, a received signal strength indication (RSSI) measurement may be used by the SSA to compare the radio coverage area of each system. The SSA may also use different types of measurements to compare a common radio link condition in different types of wireless systems.

For example, an appropriate measure of the interference level of the forward link (downlink) in an 802.11-based system is signal to noise ratio (SNR). However, to measure downlink interference in a 3G network, the mobile station must measure a signal energy to interference ratio ($E_c/I_o$) of a received pilot signal. In order to perform a comparison, the SNR and $E_c/I_o$ can each be converted to a common parameter by the SSA.

In one embodiment, the different types of measurements may be compared by mapping each into a maximum available data bit rate. Accordingly, in the above example where the available systems include a 802.11 network and a 3G network, the SSA may calculate the maximum data bit rate allowed for the 802.11 network based on the measured SNR, and the maximum data rate for the 3G network based on the measured $E_c/I_o$.

While $E_c/I_o$ provides an exemplary method of determining data rate for 3G networks, one of ordinary skill in the art will realize that the maximum available data rate for 3G systems can be determined by other means. In a further exemplary embodiment, the available data rate of a 3G network may be obtained from a data rate field in a message sent from the 3G network to the mobile unit.

Also, there are various other methods of determining a maximum available data rate for systems such as 802.11 and Bluetooth networks, as will be apparent to those ordinarily skilled in the art. The present invention thus covers all means for determining the available data rate of all various types of wireless and wireline networks, as will be contemplated by one of ordinary skill in the art.

In an alternative exemplary embodiment, different measurement types for a common radio link condition do not need to be converted to a common parameter type such as data bit rate. Instead, preference rules may be defined and used to classify each measurement into one of a variety of service level categories for a particular radio link condition. The systems can therefore be compared with each other based on their corresponding service level category. A more complete description of the different types of preference rules will be given below in the Preference Management section.

Preference Management

The basic idea behind configuration of the mobile client software is preference management—the specification of various preferences, and the construction of a set of preference rules for a user according to these preferences. There are generally two types of preferences: 1) service provider preferences, and 2) mobile user preferences. The service provider preferences are determined by the primary service provider, subscribed to by the mobile user.

For example, 3G systems generally provide wide-scale coverage and mobility, as opposed to WLANs and PANs. Therefore, a user would likely subscribe to a 3G service provider for primary service coverage, and receive the credentials needed for accessing both 3G and WLAN systems from the 3G service provider. In such a situation, "service provider preferences" are defined to be the preferences provided by a 3G service provider. It should be noted, however, that the same service provider could operate a 3G and one or more types of WLANs.

According to an exemplary embodiment, the primary service provider downloads the set of service provider preferences to the mobile client as a configuration file at the time the user initially subscribes, or signs up, to the primary service provider. The primary service provider may remotely download these rules via a wireless network at the time of activation. Alternatively, the primary service provider may download the service provider preference rules using a wireline connection (or may directly program the rules into the mobile client), for example, if the user acquires an activated mobile station directly from the primary service provider.

After the user initially subscribes, the primary service provider may remotely upgrade the service provider preference rules in the mobile client. Such upgrades may be performed whenever the primary service provider decides that new criteria should be established for selecting a best available system, determining whether the conditions for handoff have been satisfied, etc.

According to a further embodiment, each of the settable preferences may also have a default value built into the mobile client software, which is overridden by the values provided by the primary service provider in the configuration file. For example, the mobile client software would use these default values if the configuration file containing the service provider preference rules has not been downloaded.

In another embodiment, a mobile user can specify a set of preferences, e.g., through a user interface provided by the mobile client. Preferably, the service provider preference rules have priority over the user-defined preference rules. However, the user may be allowed to specify a preference for a certain type of systems according to certain criteria or conditions not addressed by the service provider preference rules.

According to an exemplary embodiment, a service provider can set one or more of the following preferences:

1) Preference for an initial system among different types of systems: This is applicable only if more than one system is available at the time a data session is being established; otherwise the mobile station would establish a data session with whichever system is available. (Example A: if both a valid 3G system and a 802.11 system is available, the 3G system is given preference; Example B: if both a high-speed wireline service and wireless system is available, the high-speed wireline is selected).

2) Service level classifications: The service provider preference rules may define a set of ranges to classify 3G pilot $E_c/I_o$ into various service level categories (e.g., "High," "Medium," "Low," and "Unavailable"). A set of sample ranges to classify 3G pilot $E_c/I_o$ measurements ($E_c/I_{o\ meas}$) into various categories is listed below:

High: 0 dB$>=E_c/I_{o\ meas}>=-4$ dB
Medium: $-4$ dB$>=E_c/I_{o\ meas}>=-7$ dB
Low: $-7$ dB$>=E_{c/Io\ meas}>=-10$ dB
Unavailable: $-10$ dB$>=E_c/I_{o\ meas}$ 3) Data Bit Rate Classifications: As discussed above, $E_c/I_o$ and SNR measurements can each be converted into one of a set of maximum allowable data bit rates for 3G and 802.11 systems, respectively. A preference rule may be defined by the service provider to classify the bit rates into various categories. An example of a rule classifying 802.11 data bit rates is listed below:

High: 11 Mbits/second
Medium: 5.5 Mbits/second
Low: 2 Mbits/second and 1 Mbits/second
Unavailable: No service available.

4) Preference for handoff among different types of systems: When more than one type of system is simultaneously available, each of which are classified in the same service level category, a service provider rule may determine which type is preferred for handoff. For example, when the available systems are limited to 802.11 and 3G networks, the following preference rule may be specified:

$802.11_{High}$ is preferred over $3G_{High}$;
$802.11_{Medium}$ is preferred over $3G_{Medium}$; and
$802.11_{Low}$ is preferred over $3G_{Low}$.

Such rules may be configured as tables stored in the mobile client. Three examples are given below with respect to Tables 1–3:

EXAMPLE 1

Rule: $802.11_{High}$ is preferred over $3G_{High}$;
$802.11_{Medium}$ is preferred over $3G_{Medium}$; and
$802.11_{Low}$ is preferred over $3G_{Low}$.

TABLE 1

Rule Table for Example 1.

|  | $3G_{High}$ | $3G_{Medium}$ | $3G_{Low}$ | $3G_{Unavailable}$ |
| --- | --- | --- | --- | --- |
| $802.11_{High}$ | 802.11 | 802.11 | 802.11 | 802.11 |
| $802.11_{Medium}$ | 3G | 802.11 | 802.11 | 802.11 |
| $802.11_{Low}$ | 3G | 3G | 802.11 | 802.11 |
| $802.11_{Unavailable}$ | 3G | 3G | 3G | Work offline or sleep |

EXAMPLE 2

Rule: $802.11_{Medium}$ is preferred over $3G_{High}$; and
$802.11_{Low}$ is preferred over $3G_{Medium}$.

TABLE 2

Rule Table for Example 2.

|  | $3G_{High}$ | $3G_{Medium}$ | $3G_{Low}$ | $3G_{Unavailable}$ |
| --- | --- | --- | --- | --- |
| $802.11_{High}$ | 802.11 | 802.11 | 802.11 | 802.11 |
| $802.11_{Medium}$ | 802.11 | 802.11 | 802.11 | 802.11 |
| $802.11_{Low}$ | 3G | 802.11 | 802.11 | 802.11 |
| $802.11_{Unavailable}$ | 3G | 3G | 3G | Work offline or sleep |

EXAMPLE 3

Rule: $3G_{High}$ is preferred over $802.11_{High}$
$3G_{Medium}$ is preferred over $802.11_{Medium}$
$3G_{Low}$ is preferred over $802.11_{Low}$

TABLE 3

Rule Table for Example 3.

|  | $3G_{High}$ | $3G_{Medium}$ | $3G_{Low}$ | $3G_{Unavailable}$ |
|---|---|---|---|---|
| $802.11_{High}$ | 3G | 802.11 | 802.11 | 802.11 |
| $802.11_{Medium}$ | 3G | 3G | 802.11 | 802.11 |
| $802.11_{Low}$ | 3G | 3G | 3G | 802.11 |
| $802.11_{Unavailable}$ | 3G | 3G | 3G | Work offline or sleep |

Note that these rule tables can be constructed without knowing the specific ranges for $802.11_{High}$, $3G_{High}$, etc. Also, note that since these examples discuss two disparate systems they describe two dimensional tables. Depending on the number of disparate systems available these could be multidimensional tables, as will be readily apparent to those ordinarily skilled in the art.

5) Thresholds for handoff from a 3G system to an 802.11 system: In a situation where a mobile station is looking to handoff from a 3G system to an 802.11 system, a threshold may be set by the preference rules indicating a minimum RSSI (as measured by the mobile unit), which the selected 802.11 system must achieve in order to perform the handoff.

However, if only one threshold is defined, a "ping-pong effect" may occur whereby the mobile station is repeatedly handed off between the two systems as the measured RSSI of the 802.11 network fluctuates above and below this threshold.

Accordingly, the service provider preference rules may define two thresholds for the measured RSSI of the selected 802.11 system. A "high watermark" $Twlan_{hi}$ indicates an RSSI threshold at which the 802.11 system is deemed available for handoff. After satisfying the $Twlan_{hi}$ threshold, if the 802.11 system dips below a "low watermark" $Twlan_{lo}$, it is deemed no longer available for handoff. In an exemplary embodiment, these two thresholds can be defined as any values between −10 dBm to −120 dBm, where $Twlan_{hi}$ is greater than $Twlan_{lo}$.

6) Thresholds for handoff from an 802.11 system to a 3G system: A threshold may also be defined for the measured RSSI of a 3G system in order to effectuate a handoff from an 802.11 system to the 3G system. Further, in order to counter the ping-pong effect, a high watermark $T3g_{hi}$ and a low watermark $T3g_{lo}$ may be defined for the 3G system. According to an exemplary embodiment, each watermark may be defined as any value between −10 dBm to −120 dBm, such that $T3g_{hi} > T3g_{lo}$.

7) Time for monitoring systems: This preference defines $T_{cq}$, a timer for monitoring the "channel quality and availability" of the channels of the available and serving wireless systems.

8) List of SLAs: A list ESSIDs for WLAN systems identify valid networks operators who have an SLA with the primary service provider to provide service for the mobile station. This list could either be dynamically loaded to the mobile client when the SLAs change, or statically downloaded at the time of the mobile client configuration. Similarly, for wireline operators it may be a list of valid network operator IDs.

It should be noted that the above list is not exhaustive, and may include rules regarding any other preferences that will be contemplated by those of ordinary skill in the art. For example, a service provider may define preferences with respect to the system loading conditions and/or network throughput of each system monitored by the SSA.

In one embodiment of the present invention, a mobile user may be allowed to define preference rules. For example, the mobile station may include a user interface, as is well known in the art, allowing the user to select certain types of preferences, or to input certain types of rules. According to this embodiment, a mobile user may define preference rules in order to set the following types of preferences:

1) Preference for a system during handoff: The user may be allowed to define a preferred type of system to be chosen for a handoff if more than one system becomes simultaneously available. In one embodiment, the user may also be allowed to indicate a preference to handoff to a particular type of available system when available, even if handoff is not necessitated by conditions of the currently serving system. For instance, the user may be allowed to establish a preference rule that always prefers a high-speed wireline network over other available wireless systems regardless of the monitored wireless network conditions.

2) Preference of network throughput: The user may indicate whether the SSA should choose between two available systems based on the criteria of network throughput.

It should be noted that the present invention covers all other types of preferences, which a user may define for the selection of a wireless or wireline system, as will be contemplated by those of ordinary skill in the art.

In an exemplary embodiment, when conflicting preferences have been set by a service provider and a mobile user, the service provider preference takes precedence. For example, the downloaded service provider preferences may include a rule causing the mobile client to choose an available 3G network rather than an available 802.11 network when the monitored conditions of the networks are roughly equivalent. However, the mobile user preferences may include a rule preferring an 802.11 network over a 3G network in the same situation. In such an example, the service provider rule may take precedence and the SSA will thus choose the 3G network.

The invention being thus described, it will be obvious that the same may be varied in many ways. Such variations are not to be regarded as a departure from the spirit and scope of the invention, and all such modifications as would be readily apparent to one skilled in the art are intended to be included within the scope of the following claims.

We claim:

1. A method for selecting a communication system to be used by a mobile unit to conduct a data session, the method comprising:
   a) determining a set of valid terrestrial wireless communication systems available to the mobile unit, the set of valid terrestrial communication systems including at least two disparate types of communication systems;
   b) selecting a communication system from the set of valid terrestrial communication systems;
   wherein the method is performed while the mobile unit is conducting the data session using a serving wireless communication system, the serving wireless communication system being in the set of valid terrestrial wireless communication systems; and
   c) performing a hand-off of the mobile unit from the serving wireless communication system to the selected communication system, if the step b) does not select the serving wireless communication system;
   wherein the step b) includes the following,
      b1) assigning a score to each respective communication system in the set of valid terrestrial wireless communication systems, b2) determining a candidate system for each of the at least two disparate types of communication systems, the candidate system being determined from the set of valid terrestrial wireless communication systems based on the assigned scores, and b3) applying at least one preference rule to the assigned scores of the candidate systems determined in the step b2) to obtain the selected communication system.

2. The method of claim 1, wherein
the step a) determines the set of available communication systems to include an actively connected wireline communication system and at least one wireless communication system.

3. The method of claim 2, wherein
the at least one wireless communication system includes a serving wireless communication system, and
the step b) selects the actively connected wireline communication system.

4. The method of claim 3, wherein
the method is performed while the mobile unit is conducting a data session using the serving wireless communication system, and
the method further including,
c) performing a hand-off of the mobile unit from the serving wireless communication system to the selected wireline communication system, the data session being maintained during the hand-off of the mobile unit.

5. The method of claim 1, wherein
the method is performed while a wireline communication system is currently serving the mobile unit, and
the method further including,
c) performing a hand-off of the mobile unit from the serving wireline communication system to the selected communication system upon detection that the mobile unit is no longer actively connected to the serving wireline communication system.

6. The method of claim 1, wherein the at least two disparate types of communication systems include at least two of: a 3G-based network, a wireless local area network (WLAN), and a personal area network (PAN).

7. The method of claim 1, wherein the step a) determines that an available wireless communication system is valid if a Service Level Agreement exists between a primary service provider of the mobile unit and the respective available wireless communication system.

8. The method of claim 1, wherein the step b) selects the communication system based on at least one of an available bit rate, a received signal strength, and a measured system performance parameter corresponding to each valid wireless communication system.

9. The method of claim 1, wherein the step b) selects the communication system based on at least one preference rule defined by a primary service provider of the mobile unit.

10. The method of claim 1, wherein the step b) selects the communication system based on at least one preference rule defined by a user of the mobile unit.

11. The method of claim 1, the method being performed during an initialization of the mobile unit, the method further including,
c) establishing a data session over the selected communication system.

12. The method of claim 1, wherein
the serving wireless communication system is disparate from the selected communication system, and wherein the step c) maintains the data session while performing the hand-off of the mobile unit.

13. The method of claim 1, wherein the step b1) assigns the score to the respective communication system based on at least one of an available bit rate, a received signal strength, and a measured system performance parameter.

14. The method of claim 1, wherein
the set of valid terrestrial wireless communication systems includes at least one IEEE 802.11-based network and at least one 3G-based network,
the step b1) assigns the score to the respective wireless communication systems based on an available bit rate, the step b1) determining the available bit rate for the at least one IEEE 802.11-based network based on a signal-to-noise ratio (SNR) measured by the mobile unit, and the step b1) determining the available bit rate for the at least one 3G-based network based on at least one of a measured pilot signal-to-interference ($E_c/I_o$) and a received data rate field.

15. The method of claim 1, wherein
the determined candidate systems include the serving wireless communication system, and wherein
the step b3) includes,
b3-1) applying the at least one preference rule to the score of each candidate system to choose a preferred candidate system,
b3-2) selecting the serving wireless communication system if the serving wireless communication system is the preferred candidate system, and
b3-3) applying a set of thresholds to the signal of the preferred candidate system to determine whether to select the preferred candidate system if the serving wireless communication system is not a preferred candidate system, the set of thresholds including a high watermark and a low watermark.

16. The method of claim 1, wherein the step b3) includes applying at least one preference rule defined by a primary service provider of the mobile unit.

17. The method of claim 16, wherein the primary service provider remotely downloads the at least one preference rule to the mobile unit.

18. The method of claim 16, wherein a primary service provider remotely upgrades the at least one preference rule, the at least one preference rule being stored at the mobile unit.

19. The method of claim 16, wherein the step a) determines that a respective wireless communication system is valid if a Service Level Agreement (SLA) exists between the primary service provider and a service provider operating the respective wireless communication system.

20. The method of claim 1, wherein the step b3) includes applying at least one preference rule defined by a user of the mobile unit.

21. The method of claim 1, further comprising
receiving an indication at the mobile unit that the serving wireless communication system cannot maintain the data session at a specified service level, and wherein
the mobile unit performs the steps a)–c) to hand-off the mobile unit to a wireless communication system capable of maintaining the data session at the specified service level.

22. The method of claim 1, the serving wireless communication system is a 3G-based network, wherein
the step b) selects one of a wireless local area network (WLAN) and a personal area network (PAN).

23. The method of claim 1, the serving wireless communication system being a cellular communication system, wherein
the step b) selects a wireless packet data network.

24. The method of claim 1, the serving wireless communication system being a wireless packet data network, wherein
the step b) selects a cellular communication system.

25. The method of claim 1, wherein the step a) includes,
a1) scanning an environment to detect at least one available wireless communication system, the scanning being performed continuously or at predefined time intervals; and
upon detection of the at least one available wireless communication system in the step a1),
a2) determining whether each detected, available wireless communication system detected in the step a1) is valid; and
a3) establishing the set of valid communication systems, the set of valid terrestrial wireless communication systems including the serving wireless communication system and each detected, available wireless communication system determined to be valid by the step a2).

26. The method of claim 25, wherein the step a2) determines that a respective system of the at least one available wireless communication system detected by the step a1) is valid if a Service Level Agreement (SLA) exists between a primary service provider of the mobile unit and a service provider operating the respective system.

27. The method of claim 1, wherein the step a) includes,
a1) receiving a message from the serving wireless communication system, the received message identifying at least one other valid wireless communication system available to the mobile unit; and
a2) establishing the set of valid communication systems, the set of valid communication systems including the serving wireless communication system and the at least one other valid wireless communication system identified by the received message.

28. A method for performing a hand-off a data session of a mobile unit from a 3G-based network to an IEEE 802.11-based network, the method comprising:
a) scanning the environment to detect signals from valid 802.11-based networks, the scanning being performed continuously or at predefined intervals;
b) determining, upon detection of a signal from at least one valid 802.11-based network, an available bit rate for each respective network of the at least one valid IEEE 802.11-based network, the available bit rate being determined based on a measured SNR of the respective network;
c) selecting a candidate network from the at least one valid IEEE 802.11-based network based on the determined available bit rate;
d) determining an available bit rate for the 3G-based network based on at least one of a measured pilot signal-to-interference ($E_c/I_o$) and a received data rate field;
e) applying at least one preference rule to the available bit rates of the candidate network and the 3G-based network;
f) applying at least one threshold to the received signal strength of the candidate network;
g) determining whether the candidate network is preferred over the 3G-based network based on the steps e) and f); and
h) performing a hand-off of the data session to the candidate network if the step g) determines that the candidate network is preferred over the 3G-based network.

29. A method for performing a hand-off a data session of a mobile unit from an IEEE 802.11-based network to a 3G-based network, the method comprising:
a) scanning the environment to detect signals from valid 3G-based networks, the scanning being performed continuously or at predefined intervals;
b) determining, upon detection of a signal from at least one valid 3G-based network, an available bit rate for each respective network of the at least one valid 3G-based network, the available bit rate being determined based on at least one of a measured pilot signal-to-interference ($E_c/I_o$) and a received data rate field of the respective network;
c) selecting a candidate network from the at least one valid 3G-based network based on the determined available bit rate;
d) determining an available bit rate for the IEEE 802.11-based network based on a measured SNR;
e) applying at least one preference rule to the available bit rates of the candidate network and the IEEE 802.11-based network;
f) applying at least one threshold to the received signal strength of the candidate network;
g) determining whether the candidate network is preferred over the IEEE 802.11-based network based on the steps e) and f); and
h) performing a hand-off of the data session to the candidate network if the step g) determines that the candidate network is preferred over the IEEE 802.11-based network.

30. A method for selecting a communication system to be used by a mobile unit to conduct a data session, the method comprising:
scanning the environment to detect signals from at least two valid terrestrial wireless communication networks, the scanning being performed continuously or at predefined intervals;
determining, upon detection of a signal from the at least two valid terrestrial wireless communication networks, an available bit rate for each perspective valid terrestrial wireless communication network, the available bit rate being determined based on a measured SNR of the respective network; and,
selecting a communication network from the at least two valid terrestrial wireless communication networks based on the determined available bit rate;
wherein the method is performed while the mobile unit is conducting the data session using a serving wireless communication system, the serving wireless communication system being one of the at least two valid terrestrial wireless communication networks; and
performing a hand-off of the mobile unit from the serving wireless communication system to the selected communication network, if the step of selecting does not select the serving wireless communication system;
wherein the step of selecting includes the following,
s1) assigning a score to each respective communication network in the set of valid terrestrial wireless communication networks, s2) determining a candidate network for each of the at least two disparate types of communication systems, the candidate network being determined from the set of valid terrestrial wireless communication networks based on the assigned scores, and s3) applying at least one preference rule to the assigned scores of the candidate systems determined in the step s2) to obtain the selected communication network.

* * * * *